C. J. GUSTAFSON.
CLUTCH FOR MOTOR CYCLES.
APPLICATION FILED APR. 4, 1912.

1,207,542.

Patented Dec. 5, 1916.
3 SHEETS—SHEET 1.

WITNESSES
Albert Popkins
Grace P. Brereton

INVENTOR
Carl J. Gustafson
By Stoddard & Mason
Attorneys

C. J. GUSTAFSON.
CLUTCH FOR MOTOR CYCLES.
APPLICATION FILED APR. 4, 1912.

1,207,542.

Patented Dec. 5, 1916.
3 SHEETS—SHEET 2.

C. J. GUSTAFSON.
CLUTCH FOR MOTOR CYCLES.
APPLICATION FILED APR. 4, 1912.

1,207,542.

Patented Dec. 5, 1916.
3 SHEETS—SHEET 3.

WITNESSES
Albert Popkins
Grace P. Brereton

Carl J. Gustafson INVENTOR
By Sturtevant & Mason
Attorneys

UNITED STATES PATENT OFFICE.

CARL J. GUSTAFSON, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

CLUTCH FOR MOTOR-CYCLES.

1,207,542.  Specification of Letters Patent.  Patented Dec. 5, 1916.

Application filed April 4, 1912. Serial No. 688,469.

*To all whom it may concern:*

Be it known that I, CARL J. GUSTAFSON, a subject of the King of Sweden, residing at Springfield, in the county of Hampden, State of Massachusetts, have invented certain new and useful Improvements in Clutches for Motor-Cycles, of which the following is a description, reference being had to the accompanying drawing and to the figures of reference marked thereon.

The invention relates to new and useful improvements in clutches, and more especially to clutches for transmitting power from the engine to the driven wheel of a motorcycle.

An object of the invention is to provide a clutch wherein the engine may run free, or wherein an infinite range of speeds may be attained, from the highest to the lowest balancing speed, through the slipping of the clutch parts one upon another.

A further object of the invention is to provide a device of the above character with speed-changing gears, whereby when the parts are clutched together so as to turn as one, two independent speeds may be secured.

These and other objects will in part be obvious, and will in part be hereinafter more fully described.

Figure 1:
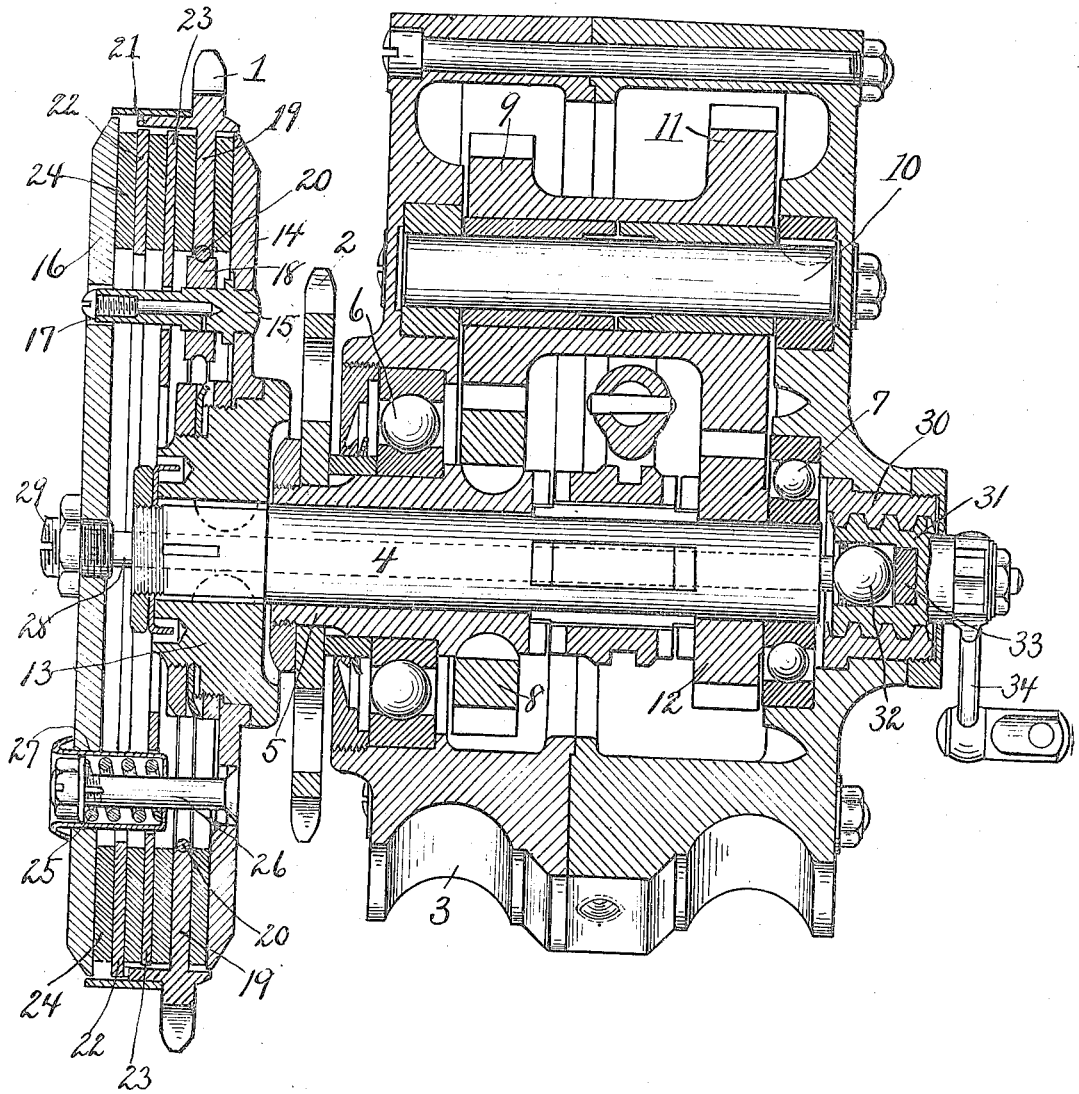
Figure 2:
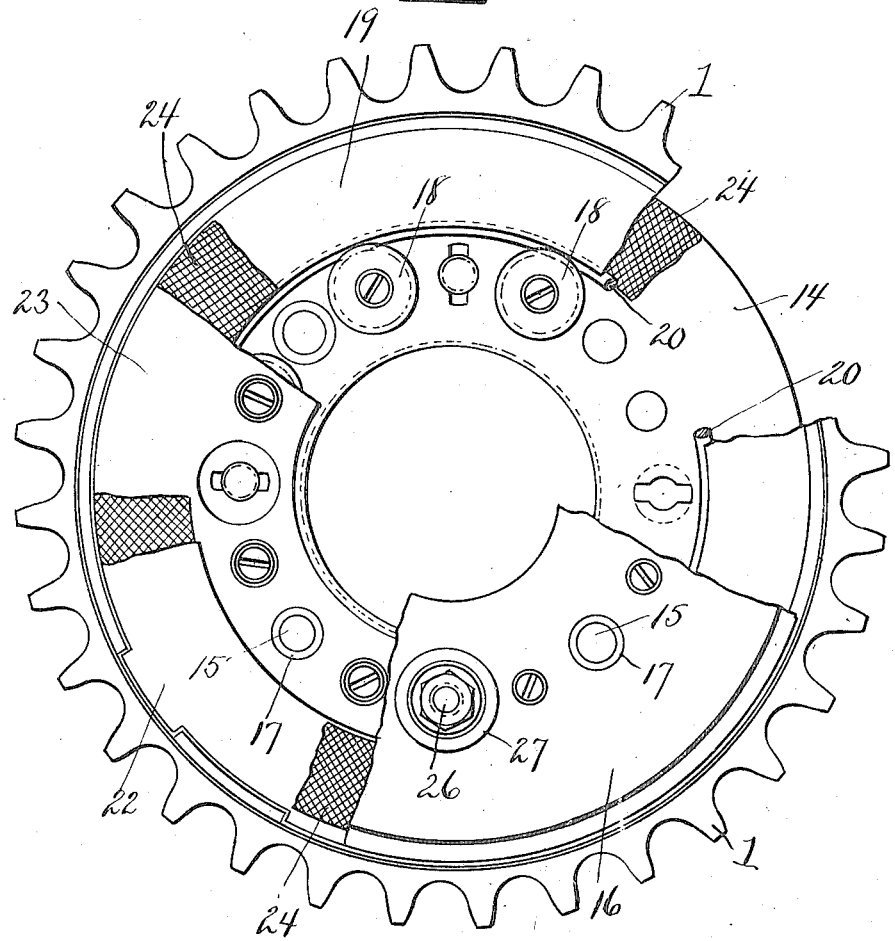
Figure 3:
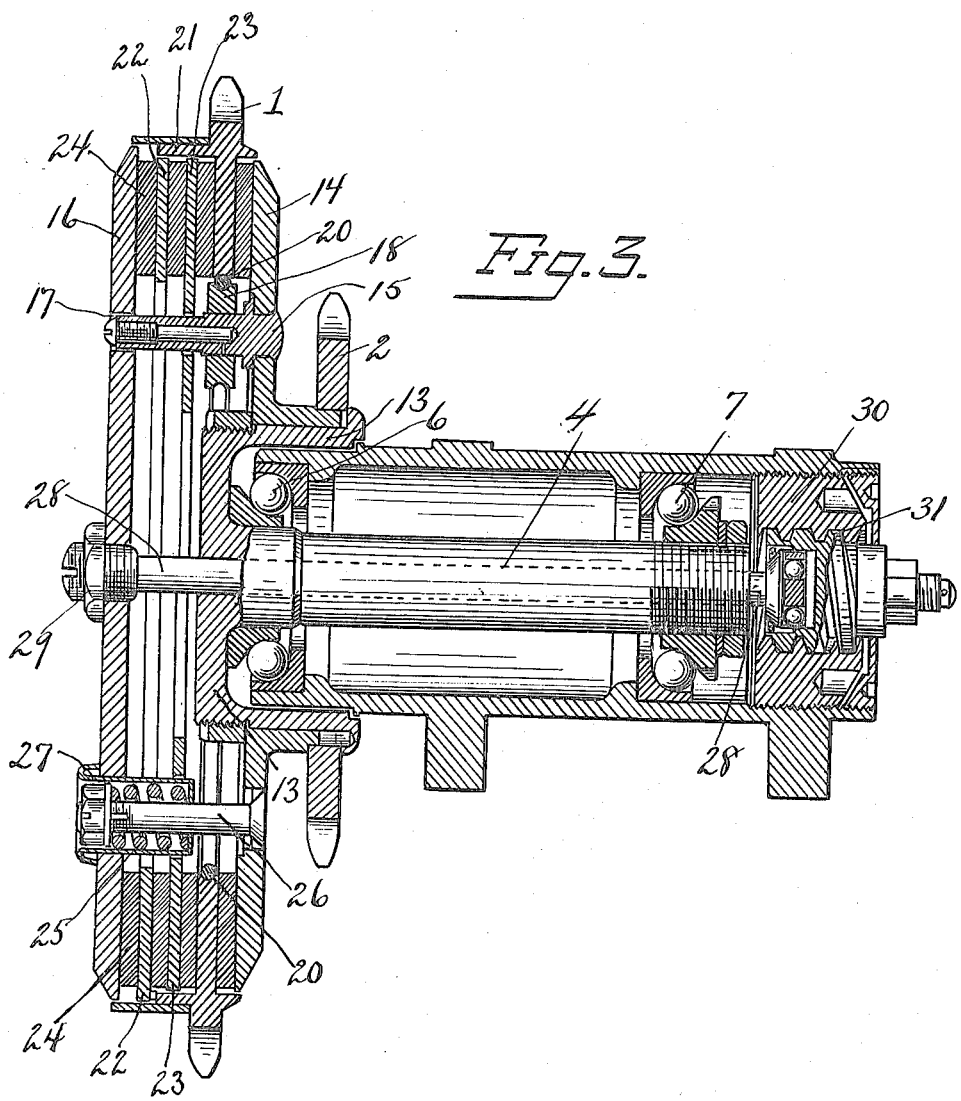

In the drawings, which show by way of illustration, one embodiment of the invention, Figure 1 is a vertical sectional view through the driving and driven members of the clutch and operating parts therefor; Fig. 2 is a face view of the driving sprocket; with parts broken away to show the inner clutching members; Fig. 3 is a view showing a modified form of the invention, in that the two-speed mechanism is omitted.

The present invention is shown as applied to the frame of a motorcycle, as the clutch is especially adapted for connecting engines with the driven part of a motorcycle. Said clutch consists of a driving member or rotating wheel 1, which, as herein shown, is in the form of a sprocket wheel, and is adapted to be connected by a sprocket chain with a suitable sprocket wheel on the engine shaft. The clutch includes also a driven member 2, which is in the form of a sprocket wheel, and this driven member is adapted to be connected by a suitable chain with the sprocket wheel on the driving wheel of the motorcycle. It is obvious, however, that these sprocket wheels may be of any other suitable form, the essential feature being that one of these members is a rotating driving member and the other a rotated driven member. These sprocket wheels are mounted on the frame 3 of the motorcycle. Passing centrally through the frame is a shaft 4, on which is loosely mounted a sleeve 5. The driven sprocket wheel 2 is locked to the sleeve 5 in any suitable way. The sleeve 5 is mounted to turn freely in ball bearings 6, which are carried by the frame 3 of the motorcycle. The other end of the shaft 4 turns freely in ball bearings 7, carried by the frame of the motorcycle. Said sleeve may be locked to the shaft 4, so as to turn with the shaft by a clutch sleeve 8', which is splined to the shaft 4 so as to turn therewith, but which may be moved endwise on the shaft, so as to engage the sleeve, or so as to be disengaged from the sleeve, so that the sleeve may run free on the shaft. Said shaft 5 carries a gear wheel 8, which meshes with a gear wheel 9 on a countershaft 10. The gear wheel 9 is formed integral or secured to a second gear wheel 11, which meshes with a gear wheel 12, which also runs free on the shaft 4. The clutch sleeve 8' may be shifted so as to engage the gear wheel 12, and thus lock said gear wheel so that it will turn with the shaft 4. This clutch sleeve 8' may be shifted axially on the shaft 4 by any suitable shifting mechanism.

From the above construction, it will be apparent that the driven sprocket wheel 2 may be connected so as to turn with the shaft 4, or may be connected through the sprocket wheels 8, 9, 11 and 12, so as to move at a different speed from that of the shaft 4. In the other end of the shaft 4 is a hub 13. This hub is rigidly secured to the end of the shaft, so as to turn with the same. Rigidly secured to the hub is a disk 14. Said disk 14 carries a plurality of studs 15, which project laterally therefrom. A second disk 16 is mounted so as to move axially relative to the shaft 4, and the disk 14, which is rigid with the hub on the shaft 4. This disk 16 is provided with openings 17, through which the studs 15 project, so that the disk 16 will rotate with the disk 14. Mounted on the studs 15 are roller bearings 18.

The sprocket wheel 1 is formed with an inwardly projecting web 19, which has a central opening concentric with the axis of the shaft 4. The inner edge of this web is grooved to receive a hardened steel wire 20. The roller bearings 18 are also grooved so as to engage the steel wire 20 carried by the inner edge of the web of the sprocket wheel.

From the above description, it will be apparent that I have provided a clutch including a rotary member. This rotary member is formed by the hub on the shaft 4, the disk 14 carried thereby, and the disk 16, which rotates with the disk 14. The wheel 1 is mounted to rotate freely on this rotary member as the web of the wheel engages the roller bearings carried by the rotary member.

The sprocket wheel 1 is also provided with an axially extending concentric flange 21, which forms a chamber within the sprocket wheel. Located in said chamber and between the disks 14 and 16, are friction disks 22 and 23. The friction disk 22 is connected so as to rotate with the sprocket wheel 1, while the friction disk 23 is connected to the projecting studs 15 carried by the disk 14. Friction pads 24 may be inserted between the inner and outer disks 14 and 16, and the friction disks 22 and 23, and also the web 19 of the sprocket wheel 1. The outer disk 16 is moved axially toward the disk 14, for the purpose of gripping the friction disks by means of springs 25. As herein shown, the inner disk 14 is provided with a plurality of bolts 26. The outer disk 16 carries sleeves 27, which are closed at their inner ends and formed with an opening to receive the bolts 26.

The springs 25 rest at one end on the closed end of the sleeve 27, and at their other end against nuts carried by the bolts 26. These springs normally force the outer disk 16 toward the inner disk 14, and cause the friction disks to clamp each other and the inwardly projecting web of the sprocket wheel to be clamped between the side plates or disks of the rotatable driven member.

In order to separate the disks 14 and 16, so as to release the friction disks and allow the wheel 1 to run free, I have provided an axially arranged rod 28. The shaft 4 has an opening centrally therethrough, and the rod 28 extends through the shaft. The outer disk 16 carries an adjusting screw 29, which bears against the end of the rod 28.

Mounted in the frame of the motorcycle is a fixed threaded sleeve or ring 30. Coöperating with this fixed ring or sleeve is a second threaded sleeve 31. Located within the sleeve 31 is a ball 32, which rests against a hardened bearing 33, and said ball is adapted to engage the inner end of the thrust rod 28. The inner sleeve 31 is turned in the stationary sleeve by an arm 34, which may be manipulated in any desired way by the rider. When the sleeve 31 is turned in the fixed sleeve 30 in the proper direction, the ball 32 will be pressed against the inner end of the rod 28, which will force the disk 16 axially outward, away from the disk 14, and thus release the friction disks. The pitch of the thread between the sleeves 30 and 31 is preferably such that said movable sleeve will remain in any adjusted position.

From the above, it will be apparent that I have provided a clutch which includes springs for normally holding the friction disks in engagement, so as to cause the driving member to impart movement to the driven member, and that I have also provided cam means which consist of the coöperating threaded sleeves, for moving an axially arranged rod or member endwise, so as to compress the springs and release the clutch members. This centrally arranged thrust rod bears directly against the outer disk, and is, therefore, rigidly connected therewith, so that any movement of one sleeve relative to the other will cause a positive separation of the clutch disks. By adjusting the screw 29, the amount of separation of the disks for any given position of the two sleeves relative to each other, may be varied.

In the construction shown in Fig. 3, the parts are precisely the same as shown in Fig. 1, with the exception that the driven sprocket wheel 2 is mounted directly on the hub 13, and is movable therewith, while in Fig. 1 said driven sprocket is connected through the speed-changing mechanism above described.

It is obvious that minor changes in the details of construction may be made, without departing from the spirit of the invention as set forth in the appended claims.

Having thus described my invention, what I claim as new and desire to secure by Letters Patent, is:—

1. The combination with a driving member and a driven member, of means for frictionally connecting said members including clamping plates on one of said members, the other member having a part extending between the clamping plates, anti-friction bearings for supporting the part extending between the clamping plates, springs for moving one of the clamping plates toward the other, and means for separating the plates including an axially arranged thrust rod adapted to engage one of said end plates and a revoluble cam for moving said thrust rod endwise to release the plates.

2. The combination of a rotatable member, a driven sprocket adapted to be connected to said rotatable member, a driving sprocket mounted on said rotatable member, clamping plates supported by said rotatable member, said driving sprocket having an inwardly projecting part extending between the clamping plates, springs for forcing one of said clamping plates toward the other for causing the plates to grip the driving sprocket, an axially arranged thrust rod for engaging the movable clamping plate for compressing the springs to release the driving sprocket, a revoluble threaded sleeve having a recess formed therein, a ball in said recess engaging the end of the thrust rod, and a fixed threaded sleeve coöperating with said revoluble threaded sleeve for forcing said rod endwise.

3. The combination of a rotatable member, a driven sprocket adapted to be connected to said rotatable member, a driving sprocket mounted on said rotatable member, clamping plates supported by said rotatable member, said driving sprocket having an inwardly projecting part extending between the clamping plates, springs for forcing one of said clamping plates toward the other for causing the plates to grip the driving sprocket, an axially arranged thrust rod for engaging the movable clamping plate for compressing the springs to release the driving sprocket, a revoluble threaded sleeve having a recess formed therein, a ball in said recess engaging the end of the thrust rod, a fixed threaded sleeve coöperating with said revoluble threaded sleeve for forcing said rod endwise, and an adjustable screw carried by the clamping plate against which the thrust rod bears.

In testimony whereof, I affix my signature, in the presence of two witnesses.

CARL J. GUSTAFSON.

Witnesses:
C. O. HEDSTROM,
FRANK J. URSEALY.